United States Patent [19]

Pouyet

[11] Patent Number: 4,542,328
[45] Date of Patent: Sep. 17, 1985

[54] PROCESS FOR ACQUIRING DATA REPRESENTATIVE OF THE SHAPE OF AN OBJECT

[75] Inventor: Jean Pouyet, Nogent sur Marne, France

[73] Assignee: Etablissements Lemoin & Cie, Paris, France

[21] Appl. No.: 432,450

[22] Filed: Oct. 4, 1982

[30] Foreign Application Priority Data

Oct. 9, 1981 [FR] France ............... 81 19015

[51] Int. Cl.$^4$ .................................. G05B 19/25
[52] U.S. Cl. .................................. 318/573; 318/568
[58] Field of Search .......... 318/567, 574, 573, 570, 318/569, 568, 572, 578, 600, 636, 150; 364/168, 169, 723

[56] References Cited

U.S. PATENT DOCUMENTS

| 3,634,667 | 1/1972 | Okamoto | 318/573 X |
|---|---|---|---|
| 3,720,814 | 3/1973 | Klein | 318/573 X |
| 3,766,369 | 10/1973 | Watanabe | 318/573 |
| 4,031,369 | 6/1977 | Heaman | 318/573 X |
| 4,118,871 | 10/1978 | Kirkham | 318/574 X |
| 4,135,239 | 1/1979 | Hamill | 318/574 X |
| 4,402,051 | 8/1983 | Nozawa | 318/572 X |
| 4,458,326 | 7/1984 | Kinoshita | 318/573 X |

FOREIGN PATENT DOCUMENTS

| 0041808 | 1/1981 | European Pat. Off. . |
|---|---|---|
| 1060968 | 7/1959 | Fed. Rep. of Germany . |
| 1563503 | 4/1970 | Fed. Rep. of Germany . |
| 1494945 | 4/1966 | France . |
| 1557915 | 1/1968 | France . |
| 2061306 | 6/1971 | France . |
| 2365406 | 9/1977 | France . |
| 1233135 | 5/1971 | United Kingdom . |

Primary Examiner—William M. Shoop
Assistant Examiner—Patrick C. Keane
Attorney, Agent, or Firm—Parkhurst & Oliff

[57] ABSTRACT

A process for acquiring data representative of at least one contour of an object by means of a feeler constrained to move in a plane, consisting of storing a succession of coordinates representative of a succession of contact points between the feeler and the object, these coordinates defining successive poles, and further associating to said successive poles a succession of arcs of circle whose radii are close to the radii of curvature of portions of the contour.

12 Claims, 8 Drawing Figures

PROCESS FOR ACQUIRING DATA REPRESENTATIVE OF THE SHAPE OF AN OBJECT

BACKGROUND OF THE INVENTION

The invention relates to a process for acquiring data representative of the shape of an object by detection of the dimensions of a number of contours of said object, which contours are determined by means of successive parallel imaginary planes in which a feeler is constrained to move.

For reproducing complex parts from a machine-tool, a copying technique is often used which consists in taking the dimensions of a model by using a feeler and using this data for controlling the movement of the tool. The copying may be carried out in real time, i.e. by driving the tool at the same time as the feeler explores the model, if the exploration takes place in a period of time compatible with that required for machining. This data may also be recorded on a magnetic support medium of perforated tape once and for all and this memory may be read whenever it is desired to copy the model. This pre-recorded process is more flexible in use to the extent that the speed of reading the information stored on the tape may be adapted to the machining time. A constant problem which is met with the use of this kind of process is to obtain a good compromise between copying accuracy and copying speed.

Systems are known where the exploration is carried out by maintaining a permanent contact between the model and the feeler and recording the coordinates from the feeler at given time intervals. Accuracy of this type of exploration is limited by the deflection of the feeler and by the quality of the positioning control of the two motors controlling the movements of the X-Y table carrying the feeler or the model. More recently, attempts have been made on the contrary to carry out exploration by a succession of contacts between the feeler and the object-model, said feeler exploring an imaginary sectional plane of the object by moving successively away from and towards the object while seeking positions in which there is contact between feeler and object. The accuracy and speed depends on the exploring pitch of the feeler. For a good accuracy, a small pitch is required, but the exploring time is all the longer the smaller the pitch. Whatever the exploration mode, storage of the information representative of the contour is generally made by storing coordinates representative of a number of contact points between feeler and model (and more particularly the coordinates from the center of the end of the feeler when contact is established) and by choosing a linear interpolation between the points (the word pole will be used further on to designate such points) represented by these coordinates. The contour of the object-model is considered as reproduced by a broken line joining together the points of the imaginary sectional plane whose coordinates correspond to contact between the feeler and the object-model.

SUMMARY OF THE INVENTION

The present invention relates to an improved feeler system, both more accurate and more rapid because of several original features, namely:

a new mode of interpolation of the curve passing through the poles selected, to improve the accuracy of the copying;

a new mode of exploring the plane of a given contour remarkable by a tangential advance of the feeler with respect to said contour;

a new mode of eliminating useless poles, so as to only store a limited number of poles for subsequently defining, with the chosen interpolation, a path for the reproducing tool within the limits of a predetermined tolerance.

More precisely, the invention relates then to a process for acquiring data representative of the shape of an object, particularly with a view to determining the path of a tool for reproducing said object, consisting in storing a succession of coordinates representative of a succession of contact points between a feeler and said object, these coordinates defining poles and being determined with respect to a reference location system, characterized in that with a given succession of poles there is associated a succession of arcs of a circle whose radii are close to the radii of curvature of successive portions of a curve of said plane representing the path of said feeler assumed to be in permanent contact with said object.

In the majority of cases, the advance of the feeler or the object after each contact is characterized by a cycle consisting:

in moving said feeler away from said object, in a direction perpendicular to the straight line segment joining the two preceding poles, in moving said feeler or said object after having imparted thereto a first change of orientation of 90° ($-\pi/2$ or $+\pi/2$, respectively), this movement being called "tangential advance", in moving said feeler or said object after imparting thereto a second change of orientation of ($-\pi/2$ or $+\pi/2$, respectively) until a possible new contact is found, and in taking into account, at least provisionally, the coordinates of a new pole in a reference location system.

BRIEF DESCRIPTION OF THE DRAWINGS

The invention will be better understood and other advantages thereof will become clear from the following description of an apparatus capable of carrying out the process of the invention and of this process itself for exploring the contour of an object-model by means of said apparatus, made with reference to the accompanying drawings in which.

DESCRIPTION OF THE PREFERRED EMBODIMENTS

Figure 1:
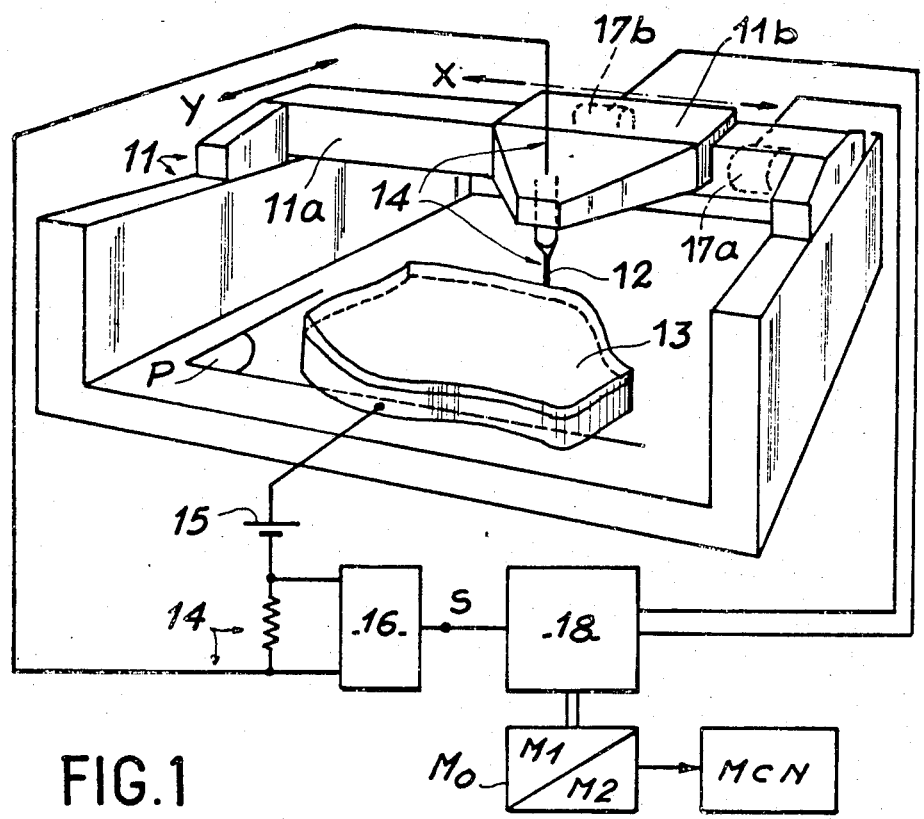
FIG. 1 shows schematically the essential elements of an apparatus in accordance with the invention.

Referring more particularly to FIG. 1, it can be seen that implementation of the process of the invention presupposes a moving system of the X-Y type 11, on which is fixed the feeler 12. The X-Y moving system provides step by step advance in the two orthogonal direction of a plane P in which the end of feeler 12 moves, following the contour of said object according to the procedure which will be described further on. In this example, a feeler has been shown on a moving system 11 and the object placed opposite on a fixed support, but it is clear that it is strictly equivalent to make object 13 integral with the moving system 11 and to use a fixed feeler. Such a variation obviously falls within the scope of the invention. Feeler 12 is of a very simple structure. It is simply an electricity conducting rod. Its end part is flexible and has preferably the same diameter and the same shape as the reproduction tool with which it is contemplated to machine the copies. In another variation, not shown, where feeler 12 would be controlled to move vertically, the structure of the feeler could be slightly different and, particularly, comprise an axially retractable part. Object 13 is conductive of electricity (it may be be metal or with a metal surface coating) so that it may be included in an electric measuring circuit 14 also comprising feeler 12. This circuit 14 is commonplace since its only function is to have two different characteristic states (presence of a current or not in the circuit) according as to whether the feeler is in contact with the object-model 13 or not. Thus, a voltage source 15 will feed into a circuit 14 when there is contact and a detector 16 coupled in parallel will deliver a logic output S connected to an input of computer 18. The moving system 11 comprises a first transverse carriage 11a moving in a direction Y of the orthogonal reference system and a longitudinal carriage 11b moving along carriage 11a in direction X of the orthogonal reference system. Each carriage 11a, 11b carries an electric motor of the step-by-step type 17a, 17b respectively, which controls its movement. These motors are controlled by computer 18 receiving the information representative of a contact between feeler 12 and the object-model 13 and programmed to carry out a certain number of operations likely to lead to implementation of the process which will be described below. The computer is coupled to a memory $M_0$ itself divided into a computing memory $M_1$ where all the information is stored required for moving the feeler and checking progressively the accuracy of the acquisition of dimensions of the object-model and a results memory $M_2$ (possibly magnetic recording means) where the information is finally stored which will become the data for driving a conventional digital control machine-tool. It should be noted that the gearing down of the transmission of movement between motors 17a and 17b and carriages 11a and 11b is relatively high so that an elementary rotation of one of the motors only causes an elementary movement of a few microns in the corresponding direction X or Y. It will then be readily understood that the plane P is in imagination cross-ruled extremely finely, each point of the cross-ruling being a possible position of the feeler. On the other hand, since the smallest paths which are imposed on feeler 12 by computer 18 are larger (of the order of a few tenths of a millimeter) and since the two motors are controlled at the same time, the result is as if the end of the feeler were able to move along any straight line segments of plane P, on the macroscopic scale of the object-model. Nevertheless, whenever the computer 18 retains "on the wing" a contact point between the feeler and the model, it assigns thereto the coordinates of the nearest point of the X-Y cross-ruling, so that the accuracy is of the order of size of this cross-ruling, i.e. a few microns. In fact, when the feeler comes into contact with the contour of the object-model, the coordinates of the center of the end of the feeler are taken into account by the computer 18 as being those of the pole sought. As soon as the contact is made, motors 17a and 17b are braked so that the feeler stops a little further on on the same path. The flexibility of the feeler allows this offset between its real position and the position of its free end which remains in contact with the contour of the object-model. At all times, the position of the feeler may be accurately determined in the reference location system by using optical rules (know per se and commercially available) disposed along the axes of said reference system or by detection and counting the steps of the motors. It will also be noted that the X-Y moving system may be principally formed by a digital control machine tool, already available in numerous firms, by modifying and/or completing the means for driving the latter, inexpensively. A machine may possibly be used for ensuring movement of the feeler and another machine, coupled to the first one, may be normally used for machining. Other types of feelers than the one which has been described above may be used. For example, instead of seeking direct electric conduction between the feeler and the object-model, which means that this latter must be conducting, commercially available precision feelers may be used comprising an auxiliary electric contactor actuated by flexion or compression of the feeler at the moment when it comes into contact with the object-model.

Figure 2:
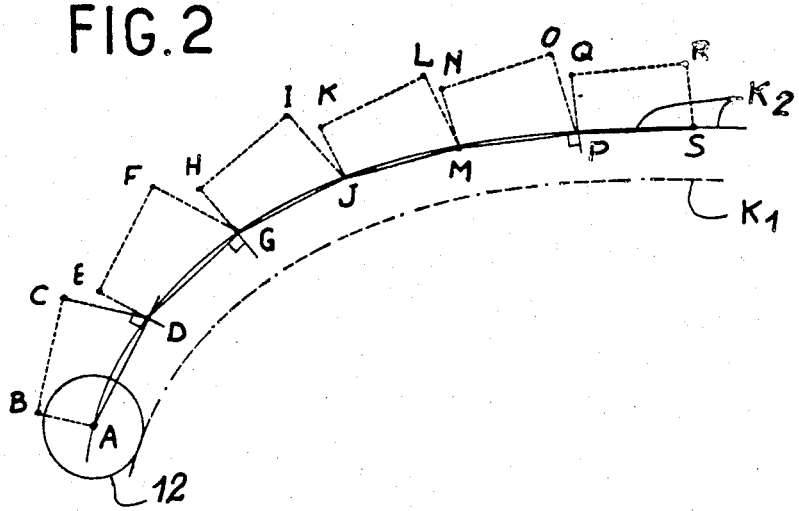
FIG. 2 illustrates the normal advance mode of the feeler along the contour of the object-model.

There will now be described, with reference to FIG. 2, the usual advance mode of feeler 12 along the contour $K_1$ of the object-model 13. If we assume that the free end of the feeler is cylindrical, the curve $K_1$ is completely within the moving plane of this end. Curve $K_2$ is the geometrical locus of the centers of the circles having the same diameter as the feeler and tangent to contour $K_1$. Consequently, the successive positions of the center of the end of the feeler at the precise moments when contact is established between feeler and model are all situated on curve $K_2$. It may be considered that the real successive positions of the center of the feeler on curve $K_2$ are the poles sought, knowing that the feeler and the reproduction tool will preferably have the same dimensions. If this were not the case, the path of the reproduction tool would be a curve parallel to the one which will be defined from processing the poles which will be described further on and would depend essentially on the difference in diameter between the tool and the feeler. The advance of the feeler is illustrated by a succession of straight line segments AB-BC-CD-DE-EF-GH-HI, etc . . . . The letters which follow each other in alphabetical order indicate, each time, a change of orientation of the movement of the feeler. The poles taken provisionally into account are A, D, G, J, M, P, S, etc. . . . Passing over from one pole to another takes place in accordance with the above-mentioned cycle, namely:

(1) Assuming that the feeler is in contact with the object-model after determination of a pole, the computer controls motors 17a and 17b to move the feeler away from the object-model 13 in a direction perpendicular to the straight line segment joining the pole which has just been determined to the preceding one. The length of this movement is a constant fixed beforehand by the operator, it must be sufficient to allow the contact to be broken between the end of the feeler and contour $K_1$, which depends on the quality of the braking of the motors, after contact has been established. Thus, referring to FIG. 2, segment DE is perpendicular to the chord AD, GH is perpendicular to the chord DG, JK is perpendicular to the chord GJ, etc. ...

(2) The computeur 18 then controls the movement of the feeler along a straight line segment after imparting thereto a first change of orientation of 90°($-\pi/2$ or $+\pi/2$) if the feeler advances in the other direction. The length of this movement, called "tangential advance" since it corresponds to movement of the feeler along curve $K_2$, is another constant fixed beforehand by the operator. In practice, it is often the double of the preceding movement. With reference to FIG. 2, these movements are shown by the segments BC, EF, HI, KL, NO, etc. ... The changes of orientation at B, E, F, K etc. ... are here equal to $-\pi/2$. (3) The computer 18 then controls motors 17a and 17b for moving the feeler again after imparting thereto a second change of orientation of $-\pi/2(90)$, until a new possible contact is found. As soon as this new contact is detected, the coordinates of the center of the end of the feeler (on curve $K_2$) are stored as new pole and the feeler is braked in its path. It stops very close to the new pole which is possible because of its own elasticity. Referring to FIG. 2, these paths of varying length of the feeler are shown by segments CD, FG, IJ, LM, OP, RS etc .... The changes of orientation at points C, F, I, L, O, R are here equal to $-\pi/2$. When the length of one of the segments exceeds a predetermined value without there being contact between the feeler and the object-model, a special advance mode of the feeler is put into effect, which will be explained further on with reference to FIG. 4.

An important feature of the invention resides in the fact that with a given succession of poles there are associated a succession of arcs of a circle whose radii are close to the radii of curvature of the successive portions of curve $K_2$. This circular interpolation gives a much more accurate approximation of the real contour than the linear interpolation usually used. Furthermore, numerous digital control machine-tools are commercially available with programming and control means for causing the cutting tool to travel over circular paths knowing the center of the circle, its radius and the two endmost points of the desired arc of a circle. The mode of interpolation chosen is then compatible with this type of machine, without a costly interface. According to a possible embodiment, memory $M_2$ will receive notonly the coordinates of these points but possibly the parameters (for example the coordinates of the center and the length of the radius) of circles passing through some of these poles. However, if sufficiently rapid computing means are available, it is also possible to simply store the coordinates of the poles, computation of the circular interpolation elements then being carried out at each machining operation, from the successive coordinates of said poles.

Several circular interpolation methods are possible. For example, the circular interpolation may be achieved by associating with the portion of curve $K_2$ limited by two consecutive poles, for example D and G, the portion of the circle passing through these two poles and the preceding pole A. There may be associated therewith the portion of the circle passing through these two poles and the next pole J. Another choice consists in associating with the interval DG, the portion of a circle passing through these two poles having as radius half the sum of the radii of the circle passing through these two poles and the preceding pole (namely A) and of the circle passing through the same two poles and the next pole (namely J). In this latter case, the error is divided by two, with respect to the two other circular interpolation methods mentioned above.

Figure 3:
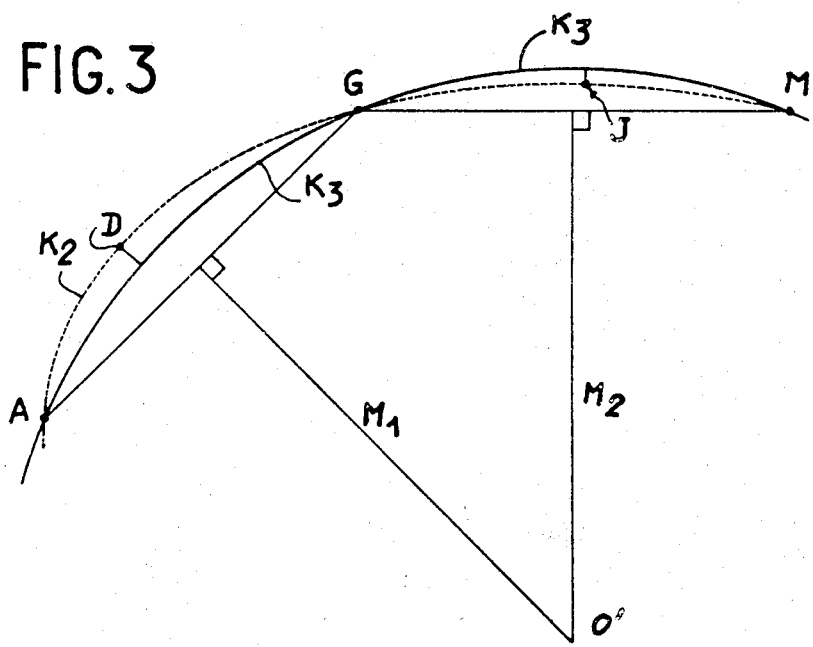
FIG. 3 illustrates the chosen circular interpolation and a procedure for eliminating useless poles.

If the chosen tangential advance is relatively small, considering the minimum radius of curvature of contour $K_1$, there may be simply associated with a succession of three adjacent poles the arc of a circle passing through these three poles and limited by the two endmost poles. It is this type of interpolation which is used in the procedure for eliminating useless poles which will now be described with reference to FIG. 3. It should however be understood that this method of eliminating useless poles for reducing the information finally stored on a magnetic tape or perforated tape may be used with another type of circular interpolation whatever the way in which the provisional poles have been determined. The initial condition for implementing the procedure for identifying curve $K_2$ and reducing the number of poles is that the circle passing through the first three of a given succession of ples (A, D, G) may be likened to a corresponding section of curve $K_2$, in the required limits of accuracy. Pole A is called starting pole. The procedure is then the following:

Three non consecutive poles are selected, for example A, G and M. Preferably, the second pole G will always be separated from the first one and from the third by an equal number of poles (D and G respectively in the present case); these later poles will be called intermediate poles. The parameters of the circle $K_3$ passing through the three selected poles are calculated. Given then the arc of a circle AGM defined by the coordinates of its center O' and by its radius O'A (FIG. 3). These two parameters may be easily calculated in real time for they only require the processing of equations of the first degree. The coordinates of O' may then in fact be obtained by determining the equations of the two mid-perpendiculars $M_1$ and $M_2$ of the two coordinates AG and GM drawn between each selected end pole (A,M) and the selected median pole (G) then by determining the intersection of these two mid-perpendiculars M1 and M2. The radius of the circle is then simply given by the distance O'A (or O'G or O'M).

Then it is verified that the distance between the arc of a circle AGM and each of the intermediate poles D and J is less than a chosen value of accuracy. In the affirmative three other non consecutive poles are selected, spaced further apart from each other, the starting pole being kept and the two preceding operations are again carried out for determining the parameters of a new circle and comparing the distance separating each corresponding intermediate pole from this circle. Thus, with reference to FIG. 2, the three poles selected at the second sequence could be A, J, S, pole J being again separated from each end pole A or S by two intermediate poles, respectively D, G and M, P.

These sequences are repeated by including each time a larger number of poles until, for a given sequence, the distance of at least one of the intermediate poles to the last calculated circle exceeds the chosen value of accuracy. When this event occurs, that means that the approximation of a portion of curve $K_2$ cannot be made, considering the accuracy desired, by a circle passing through these three poles of the curve. It is sufficient to come back to the immediately preceding situation in which this condition was verified and consequently to definitively eliminate all the intermediate poles between the starting pole (A) and the third pole selected in the last but one selection. This third pole selected is then considered as a new starting pole and the procedure begins again until all the poles provisionally defined on curve $K_2$ during exploration are exhausted.

As was mentioned above, the final storing in memory $M_2$ may take place in different ways. For example, when the last but one pole selection has been identified, the coordinates of these three poles may be simply definitively stored. In this case, the parameters of the corresponding circle will be determined each time an in real time, at the time of reproduction machining of the model. However, since the parameters of this circle have in any case been computed for eliminating the intermediate poles, it is also possible to definitively store, on the one hand, the parameters of this circle and, on the other hand, the coordinates of the endmost poles of the last but one selection, storing of the selected median pole then being pointless. Determination of the distance from an intermediate pole to a circle may be achieved, with very short computation time, by computing the difference between the distance from this pole to the center of the circle considered and the radius of this circle. For example, with reference to FIG. 3, the distance from pole D to the arc of a circle AGM is equal to O'D less O'A and the distance from pole J to the arc of a circle AGM is equal to O'J less O'A.

The successive selections of the three poles, spaced further and further apart from each other, from the same starting pole, may define an arithmetical progression. Thus, for such a progression, with the order of the poles represented by the whole of the positive integers, the triplets of poles successively selected will be: (1,2,3)-(1,3,5)-(1,4,7)-(1,5,9), etc . . . .

In other words, knowing a triplet (1,n,m) the next triplet will be (1,n+1,m+2) or any other type of predetermined arithmetical progression.

For speedier operation, in the case more especially where a large number of poles are to be eliminated, it may be provided for the successive selections of the three poles from the same starting pole to define a geometrical progression. For such a progression, the successively selected pole triplets could be: (1,2,3)-(1,3,5)-(1,5,9)-(1,9,17), etc . . . .

In other words, knowing a triplet (1,n,m), the next triplet could be (1,2n−1,2m−1) or any other type of predetermined geometrical progression.

For the ease of understanding, it has been supposed that the feeler was cylindrical. It is clearly obvious that, since the feeler must preferably have the same shape and the same dimensions as the reproduction tool which will be subsequently used, this feeler will very often have a hemi-spheric end. That changes nothing, neither in the mode of advance of the feeler, nor in the procedure for eliminating poles. The only difference resides in the fact that curve $K_1$ representing the locus of the contact points between the feeler and the model is not necessarily flat, which changes nothing for recopying since the contact point of the tool with the workpiece will follow exactly the same path.

Figure 4:
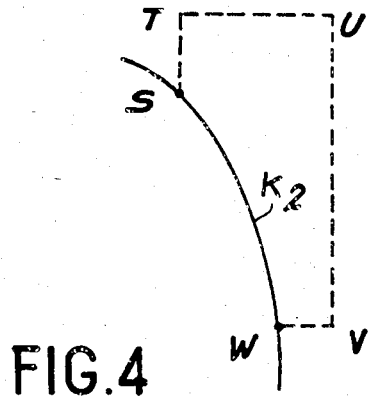
FIG. 4 illustrates the behavior of the feeler in the case where the advance mode illustrated in FIG. 2 must be provisionally abandoned.

FIG. 4 illustrates a special mode of advance for the feeler. In this variation, the amplitude of movement UV after the second change of orientation is compared with the amplitude of the tangential advance TU as long as contact between the feeler and curve $K_2$ does not occur. When the ratio between these two amplitudes reaches a predetermined value, for example 2, the computer is programmed to impart to the feeler a third change of orientation of $-\pi/2(90)$. The feeler then moves from V in this new direction until a new pole W is determined.

Figure 5:
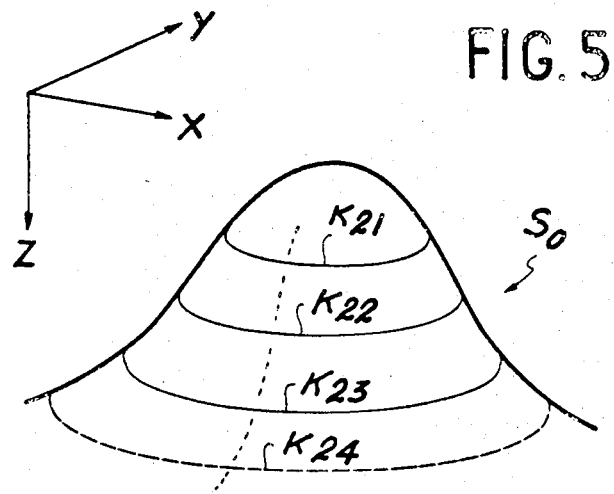
FIGS. 5 to 8 illustrate the automatic determination of a change of plane of the end of the feeler along a direction of an orthonormed system of axes for exploring successive contours of the object-model.
Figure 6:
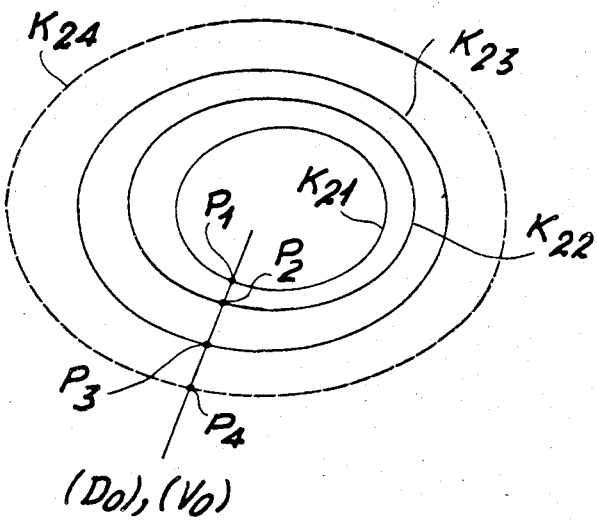
Figure 7:
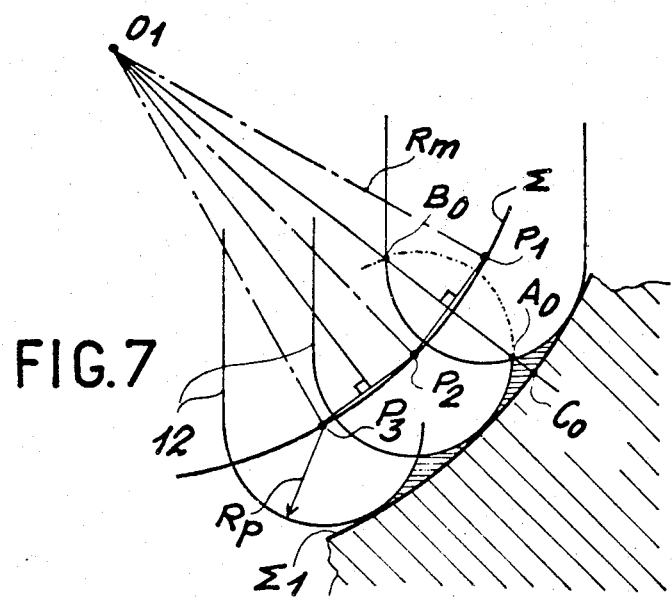

All that has been described up to now illustrates the movement of the end of the feeler in the same plane, as well as the acquisition and the processing of data which result therefrom. There will now be explained how the plane of exploration may be automatically changed in which said end moves, with a view to storing in memory the poles of a succession of corresponding contours of the object-model, the distance between the successive exploration planes (parallel to each other and offset in a direction of the reference location system, for example a direction perpendicular to plane P of FIG. 1) being made variable as a function of the curvature of the object, on the one hand, and on the chosen accuracy value on the other. The implementation of this procedure presupposes of course that the apparatus of FIG. 1 is completed to allow controlled movement of the feeler, in a direction perpendicular to plane P, by means of an additional motor or similar, not shown. This condition is automatically fulfilled when the X-Y-Z moving system is formed from a digital control machine-tool, as mentioned above. The feeler and, subsequently, the machine-tool are assumed to be cylindrical with a hemi-spherical end. FIG. 5 illustrates a three dimensional surface $S_0$ defining the geometrical locus of the center of the end of the feeler assumed to be in permanent contact with the objectmodel (not shown). The contours $K_{21}$, $K_{22}$, $K_{23}$ . . . define then parallel planes offset vertically, for example, and in which the center of the end of the feeler has moved successively to identify the contour of the object in the vicinity of these planes. The automatic determination of the dimensions of the contour along $K_{24}$ assumes that the poles of the three preceding contours have been determined. Consequently, the use of the procedure presupposes that the interplane variation of the first three contours has been suitably chosen by the operator. He will choose, preferably, planes relatively close together. Computation of the dimension variation (direction Z) for passing from the third contour $K_{23}$ to the next contour $K_{24}$ (or more generally for passing from contour $K_{2i}$ to contour $K_{2(i+1)}$) will than take place when the poles of the three preceding successive contours have been determined or, at the earliest, at the same time as determination of the poles of the third contour $K_{23}$. FIG. 6 shows a plane view, along X-Y, of the surface of FIG. 5. It is clear that if the center of the tool, instead of moving over the whole surface $S_0$ by infinitesimal changes of level, only moves in the planes of contours $K_{21}$, $K_{22}$, $K_{2i}$, the surface of the object reproduced by this tool will not have a smooth appearance but will be formed of a succession of parallel furrows. If we consider $P_3$, a pole of contour $K_{23}$, the curve $D_0$ passing through $P_3$ and perpendicular to all the intersections of surface $S_0$ through horizontal planes, intersects contour $K_{22}$ at $P_2$ and contour $K_{21}$ at $P_1$. In the example shown, where the planes are horizontal, which corresponds to a succession of passes round the object-model, $D_0$ corresponds to a line having the greatest slope of surface $S_0$ and, if the three above-mentioned contours are not very distant, $D_0$ is a straight line. Let us assume $V_0$ to be the vertical plane passing through $D_0$. In practice, for each plane $V_0$ there are selected the three poles $P_1$, $P_2$ and $P_3$ of the respective contours $K_{21}$, $K_{22}$ and $K_{23}$ situated the nearest to said plane. FIG. 7 illustrates two positions of feeler 12 in which the center of its end is placed in plane $V_0$ at $P_1$ and $P_2$, respectively. In other words, the feeler is assumed to be in contact with the object-model 13 on contours $K_{21}$ and $K_{22}$ respectively in the plane $V_0$. If we let $\Sigma_1$ be the profile of the object-model 13 in the vertical plane $V_0$ and $\Sigma$ the path from the center of the hemispherical end of the feeler to pass from pole $P_1$ to pole $P_2$, in plane $V_0$, assuming that a permanent contact is established between the feeler and the surface of object 13 following path $\Sigma_1$. The selected poles $P_1$, $P_2$ and $P_3$ are on curve $\Sigma$. The two spheres centered at $P_1$ and $P_2$ (showing the end of the feeler when it is situated at the two poles $P_1$ and $P_2$) intersect along a circle of diameter $A_0 B_0$ and the ridge $\Sigma$ which would be left during machining between the first and second contours $K_{21}$ and $K_{22}$ is shown by the distance $A_0 C_0$, $C_0$ being the intersection of the extension of diameter $A_0 B_0$ with the object-model 13, i.e. with curve $\Sigma_1$. It can be demonstrated that this ridge is determined by the following approximate formula:

$$\epsilon = \frac{(P_1 P_2)^2}{8} \left[ \frac{1}{Rm} + \frac{1}{Rp} \right] \quad (1)$$

where

Rp is the radius of the feeler,

Rm is the radius of curvature of curve $\Sigma$ in the vicinity of poles $P_1$ and $P_2$.

Rp thus is known and, in practice, Rm may be easily determined in a first approximation as being the radius of the circle passing through poles $P_1$, $P_2$ and $P_3$ selected in plane $V_0$ (or at most close thereto). As previously described, with reference to FIG. 3, it is then sufficient to determine the equations of the two mid-perpendiculars of segments $P_1 P_2$ and $P_2 P_3$ to obtain at their intersection the coordinates of the center $O_1$ of the circle passing through poles $P_1$, $P_2$ and $P_3$.

Furthermore, knowing that the magnitude of ridge $\Sigma$ is proportional to the square of an oblique increment (i.e. a movement of the feeler along the cicle passing through $P_1$, $P_2$ and $P_3$) it is possible, from pole $P_3$, to anticipate the position of a point of a future possible contour ($K_{24}$) by determining the coordinates of a possible pole $P_4$ on this circle, beyond $P_3$ and such that:

$$P_3 P_4 = P_2 P_3 \sqrt{\frac{\epsilon_o}{\epsilon}} \quad (2)$$

where $P_2 P_3$ is the distance separating the two known poles $P_2$ and $P_3$;

$P_3 P_4$ is the distance from the possible pole sought $P_4$ to the third known pole $P_3$, $\Sigma$ is the ridge known from formula (1) between contours $K_{21}$ and $K_{22}$, $\Sigma_o$ is the upper tolerable limit of the ridge, chosen by the operator.

Figure 8:
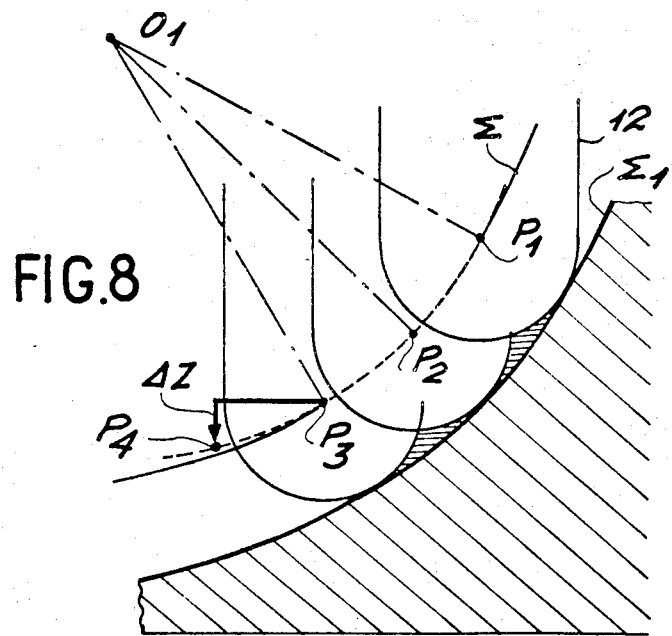

This is what is illustrated in FIG. 8.

Mention has been made of "possible pole", for it is not sufficient to carry out the operations which have just been described only in the arbitrarily chosen plane $V_0$ to obtain a suitable starting point for the future contour $K_{24}$. On the contrary, these operations are begun again for a number of vertical planes evenly spaced apart all round the surface $S_0$ (thus, at most, as many vertical planes may treated as there are poles of contour $K_{23}$, and each time the oblique increment is computed on the corresponding circle passing through the three poles selected in this plane. Whenever an oblique increment is determined, i.e. when the coordinates of the fourth possible pole are known, the corresponding dimensional variation $\Delta Z$ along the direction normal to all the parallel planes of contours $K_2$ must be deduced and the end of the feeler must be moved by the smallest value $\Delta Z$ found, for the whole of the planes similar to $V_0$, in said direction, i.e. along Z in the example shown, before effectively beginning the exploration of the new contour $K_{24}$. Thus, it can be ensured that the value of the ridge $\Sigma$ left between the new corresponding path of the tool and the preceding one will at all points be less than the value $\Sigma_o$ chosen at the start.

Of course, what has just been described corresponds to the automatic determination of the dimension along Z of the fourth contour, knowing the poles of the first three (fixed by the operator), but it is clear that this procedure is renewed in the same way to determine the position along Z of the $n^{th}$ contour, knowing the poles of the preceding three, the variation of dimension to go from one contour to another always taking place in the same direction.

The procedure which has just been described may be considerably simplified, in the case especially where the radius of curvature Rm along the third contour $K_{23}$ varies but little. The first two operations described above, namely the selection of three poles situated substantially in each plane $V_0$ and the determination of the corresponding ridge value $\Sigma$ (formula (1)) do not change. On the contrary, as soon as this ridge value is known for a given plane $V_0$, the plane is changed and computation of the ridge value is begun again. Finally, the selection and the vertical plane are chosen for which the calculated ridge value $\Sigma$ is the greatest and from the corresponding pole $P_3$ are directly extrapolated the coordinates of a point (real and certain) of the future contour, beyond pole $P_3$. The extrapolation further takes place on the circle passing through poles $P_1$, $P_2$ and $P_3$, giving the greatest ridge between $P_1$ and $P_2$. Then, as before, the feeler is moved by a value $\Delta Z$ corresponding to the variation of dimension between pole $P_3$ and point $P_4$ of the future contour $K_{24}$, point $P_4$ then serving as starting pole for the exploration of this new contour. This way of proceeding is more rapid, since it only requires a single extrapolation. Similarly, it is possible to extrapolate $P_4$ from $P_3$, not on the circle passing through $P_1$, $P_2$ and $P_3$ but on the straight line $P_2 P_3$.

Furthermore, vertical changes of plane and exploration of the contours along horizontal planes (passing round) have been shown but it is clear that the opposite is possible, namely a succession of explorations in vertical planes (sweeps), the successive contours being then open contours.

What is claimed is:

1. A process for acquiring data representative of the shape of an object comprising the steps of:

selecting an object having a surface the shape of which may be represented by a plurality of points defining poles;

moving one end of a feeler and said object into contact with one another at a succession of contact points defining said poles such that said contact points lie in a plane within a reference coordinate system, said feeler and object being constrained to move substantially along straight line segments in said plane while moving to produce said succession of contact points defining said poles and said moving step comprising the following cyclic steps for at least a portion of said moving, moving said feeler and object away from one another in a first direction perpendicular to a straight line joining two preceding poles;

moving said feeler and object relative to one another in a second direction perpendicular to said first direction, and moving said feeler and object relative to one another in a third direction perpendicular to said second direction until the next successive point of contact is detected;

detecting said contact between said object and feeler to define said poles;

determining in said reference coordinate system the coordinates of said poles in said plane;

storing the coordinates of said poles;

computing from said poles a plurality of arcs of circles defining the shape of the object between said poles, each arc being defined by at least two of said poles; and providing a set of coordinates of said poles and of computed arcs as data representing the shape of said object.

2. The process as claimed in claim 1 wherein said movement in said first and second directions are movement defined by predetermined distances.

3. The process as claimed in claims 1 or 2 wherein said moving during said cyclic steps further comprises comparing the amplitude of the distance of movement in said third direction with the amplitude of the distance of movement in said second direction, and moving said feeler and object relative to one another in a fourth direction perpendicular to said third direction when said comparison reaches a predetermined value until said object and said feeler detect the next successive pole.

4. A process for acquiring data representative of the shape of an object comprising the steps of:

choosing an object having a surface the shape of which may be represented by a plurality of points defining poles;

moving one end of a feeler and said object into contact with one another at a succession of contact points defining said poles such that said contact points lie in a plane within a reference coordinate system;

detecting said contact between said object and feeler to define said poles;

determining in said reference coordinate system the coordinates of said poles in said plane;

storing the coordinates of said poles;

computing from said poles a plurality of arcs of circles defining the shape of the object between said poles, each arc being defined by at least two of said poles and wherein the arc between two non-consecutive poles is defined by a portion of a circle passing through said two non-consecutive poles and another pole situated therebetween, said computing step including, selecting three non-consecutive poles including a starting pole, calculating the arc of a circle passing through said three non-consecutive poles, determining if the distance between the arc passing through said three non-consecutive poles and each of any intermediate poles is less than a predetermined value, repeating said selecting and calculating steps when said distance is less than said predetermined value for a different three non-consecutive poles separated by a greater distance and including said starting pole, and deleting the storage of said intermediate poles between said starting pole and the third of said three non-consecutive poles and storing said computed arc between said starting and third pole upon a detection of a distance between said computed arc and at least one intermediate pole exceeding said predetermined value; and providing a set of coordinates of said poles and of computed arcs as data representing the shape of said object.

5. The process as claimed in claim 4 wherein the successive selection of said three non-consecutive poles from a starting pole define an arithmetical progression.

6. The process as claimed in claim 4 wherein the successive selection of said three non-consecutive poles from the starting pole define a geometrical progression.

7. The process as claimed in claim 4 wherein the coordinates of the center and the radius of a circle passing through said three poles define a computed arc, said coordinates of the center of said arc being determined by calculating the coordinates of the point of intersection of two lines extending perpendicularly from the midpoint of the chords extending between the end poles and the median pole of said three poles and said radius being determined by calculating the distance between said point of intersection and any of said three poles.

8. The process as claimed in claim 7 wherein said distance from a given intermediate pole to said arc of a circle is determined by calculating the difference between the distance from said given intermediate pole to said center and said determined radius.

9. The process for acquiring data representative of the shape of an object comprising the steps of:

choosing an object having a surface the shape of which may be represented by a plurality of points defining poles;

moving one end of a feeler and said object into contact with one another at a succession of contact points defining said poles such that said contact points lie in a plane within a reference coordinate system, said feeler including a rounded end;

detecting said contact between said object and feeler to define said poles;

determining in said reference coordinate system the coordinates of said poles in said plane;

storing the said coordinates of said poles;

computing from said poles a plurality of arcs of circles defining the shape of the object between said poles, each arc being defined by at least two of said poles;

providing a set of coordinates of said poles and of computed arcs as data representing the shape of said object; and moving said feeler and object relative to one another for detecting poles in a plurality of planes each defining a separate contour of said object to determine the poles of at least three successive adjacent planes defining three contours of said object, and further comprising, selecting three poles from said three planes which lie in a plane normal to the planes defining said contours, determining the value of a ridge defined between the first and second contours in said normal plane, extrapolating the coordinate of a point of a projected contour beyond said third contour, repeating said selecting, determining and extrapolation for the three poles of three planes in a different plane normal to said three adjacent contours, and moving said feeler a distance equal to the smallest variation between a pole of said third contour and the projected pole for determining the next successive series of poles defining a plane.

10. A process for acquiring data representative of the shape of an object comprising the steps of:

choosing an object having a surface the shape of which may be represented by a plurality of points defining poles;

moving one end of a feeler and said object into contact with one another at a succession of contact points defining said poles such that said contact points lie in a plane within a reference coordinate system, said feeler including a rounded end;

detecting said contact between said object and feeler to define said poles;

determining in said reference coordinate system the coordinates of said poles in said plane;

storing the said coordinates of said poles;

computing from said poles a plurality of arcs of circles defining the shape of the object between said poles, each arc being defined by at least two of said poles;

providing a set of coordinates of said poles and of computed arcs as data representing the shape of said object;

moving said feeler and object relative to one another for detecting poles in a plurality of planes each defining a separate contour of said object to determine the poles of at least three successive adjacent planes defining three contours of said object, and further comprising, selecting three poles from said three planes which lie in a plane normal to the planes defining said contours, determining the value of a ridge defined between the first and second contours in said normal plane, repeating the selecting and determining steps for a plurality of normal planes, selecting the normal plane having the greatest ridge value between the first and second contours, extrapolating the coordinates of a point for a projected contour beyond the pole of the second contour of the normal plane having the greatest ridge value between the first and second contours, and moving said feeler in a direction to select a new contour by a value corresponding to the difference between the selected pole of said third contour in said normal plane and said extrapolated point of the corresponding projected contour.

11. The process as claimed in claims 9 or 10 wherein a feeler having a hemispherical end is employed and wherein said ridge is determined by the formula:

$$\epsilon = \frac{(P_1 P_2)^2}{8} \left[ \frac{1}{Rm} + \frac{1}{Rp} \right]$$

where $\Sigma$ is the ridge value to be determined, $P_1 P_2$ is the distance separating the selected poles of the first two contours, Rm is the radius of the circle passing through the three selected poles, and Rp is the radius of the hemispherical end of said feeler.

12. The process of claims 9 or 10 wherein said extrapolation is determined each time beyond the pole of said third contour on the circle passing through the three selected poles of those contours by applying the formula:

$$P_3 P_4 = P_2 P_3 \sqrt{\frac{\epsilon_o}{\epsilon}}$$

where $P_3 P_4$ is the distance separating said third pole from said projected pole, $P_2 P_3$ is the distance separating the second and third selected poles, $\Sigma$ is said ridge value and $\Sigma_o$ is a predetermined ridge value.

* * * * *